United States Patent
Wan et al.

(10) Patent No.: US 11,442,947 B2
(45) Date of Patent: Sep. 13, 2022

(54) ISSUES RECOMMENDATIONS USING MACHINE LEARNING

(71) Applicant: SAP SE, Walldorf (DE)

(72) Inventors: Deng Feng Wan, Shanghai (CN); Yangchun Deng, Shanghai (CN); Zuxing Wang, Shanghai (CN); Hui Zhang, Shanghai (CN)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 16/909,843

(22) Filed: Jun. 23, 2020

(65) Prior Publication Data

US 2021/0397625 A1 Dec. 23, 2021

(51) Int. Cl.
*G06F 16/2457* (2019.01)
*G06N 3/08* (2006.01)
*G06N 20/00* (2019.01)

(52) U.S. Cl.
CPC ......... *G06F 16/24578* (2019.01); *G06N 3/08* (2013.01); *G06N 20/00* (2019.01)

(58) Field of Classification Search
CPC .................................................. G06F 16/24578
USPC ........................................................ 707/749
See application file for complete search history.

(56) References Cited

U.S. PATENT DOCUMENTS

| | | | |
|---|---|---|---|
| 11,200,288 B1 * | 12/2021 | Baker | G06F 16/24578 |
| 2018/0246973 A1 * | 8/2018 | Zhao | G06F 16/9535 |
| 2019/0287070 A1 * | 9/2019 | Buchanan | G06Q 10/1053 |
| 2020/0151577 A1 * | 5/2020 | Ogawa | G06Q 20/308 |
| 2020/0380074 A1 * | 12/2020 | Li | G06F 16/285 |
| 2020/0410025 A1 * | 12/2020 | Arunmozhi | G06F 16/9536 |
| 2021/0064627 A1 * | 3/2021 | Kleiner | G06F 16/248 |

* cited by examiner

*Primary Examiner* — Kimberly L Wilson
(74) *Attorney, Agent, or Firm* — Klarquist Sparkman, LLP (57) ABSTRACT

A query is received that requests issues relevant to a user. Thereafter, a plurality of issues responsive to the query are retrieved. The retrieved issues are ranked using a first machine learning model to result in a first subset of the retrieved issues. The first subset of the retrieved issues are then ranked using a second, different machine learning model to result in a second subset of the retrieved issues which are a subset of the first subset of the retrieved issues. Data can then be provided which is responsive the query and includes at least a portion of the second subset of the retrieved issues. Related apparatus, systems, techniques and articles are also described.

18 Claims, 9 Drawing Sheets

ISSUES RECOMMENDATIONS USING MACHINE LEARNING

TECHNICAL FIELD

The subject matter described herein relates to the provision of issues recommendations utilizing machine learning.

BACKGROUND

Issue management systems/modules allow for a user, by way of a graphical user interface, to identify issues relating to a particular topic or subject of interest. In some cases, an enterprise can have a portal of open issues which require resolution. Identification of related, closed issues is an important component in issue management systems as they allow for the leveraging of existing knowledge when addressing open issues which, in turn, allows for more rapid issue resolution.

SUMMARY

In a first aspect, a query is received that requests issues relevant to a user. Thereafter, a plurality of issues responsive to the query are retrieved. The retrieved issues are ranked using a first machine learning model to result in a first subset of the retrieved issues. The first subset of the retrieved issues are then ranked using a second, different machine learning model to result in a second subset of the retrieved issues which are a subset of the first subset of the retrieved issues. Data can then be provided which is responsive the query and includes at least a portion of the second subset of the retrieved issues.

The first machine learning model can take varying forms including a logistic regression model.

The second machine learning model can take varying forms including a neural network model such as a DeepFM model.

The plurality of issues can be retrieved using different retrieval modalities. One of the retrieved modalities can include predicting scores for the user against each issue using an alternating least squares algorithm, ranking the issues according to their scores, and filtering out scores below a pre-defined threshold. In some variations, one of the modalities includes filtering the retrieved plurality of issues based on collaborative filtering in relation to issues. The collaborative filtering in relation to issues can use an issues similarity matrix. The issues similarity matrix can be generated by identifying, based on issues data, a predefined number of top keywords associated with the user using a term frequency-inverse document frequency, generating, based on issues data, a plurality of word vectors using a word embedding model, generating a plurality of issue vectors based on the identification of the predefined number of top keywords and the generated plurality of word vectors, and calculating a similarity between each pair of issue vectors to result in the issues similarity matrix.

The retrieved plurality of issues can additionally or alternatively be based on collaborative filtering in relation to users. The collaborative filtering in relation to users can use a users similarity matrix. The users similarity matrix can be generated by generating a plurality of user profile vectors and calculating a similarity between each pair of user profile vectors to result in the users similarity matrix. Each user profile vector can be generated by concatenating a user keywords vector with a user basic vector.

The user keywords vector can be derived from a user actions log which comprises information comprising a user identification (ID), issue ID, a type of action associated with the issue, a timestamp for the action, and a duration of the action. Each issue can be scored based on the user actions. Keywords for the user can be ranked based on the scoring of the issues to generate a top keywords list. The user keywords vectors can be generated based on the top keywords.

Providing data can include one or more of: causing the data to be displayed in a graphical user interface, loading the data into memory, storing the data in physical persistence, or transmitting the data to a remote computing system.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides improved recommendations to resolve issues as compared to conventional techniques for providing recommendations.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a recommendation framework (e.g. profile, retrieval, and ranking) using an in-memory database that can provide topical results in a quick manner. Such a framework can be used with various data retrieval systems including, as an example, an issues management system. With this example, advanced text processing and similarity calculations are employed to accurately model properties of issues.

Figure 1:
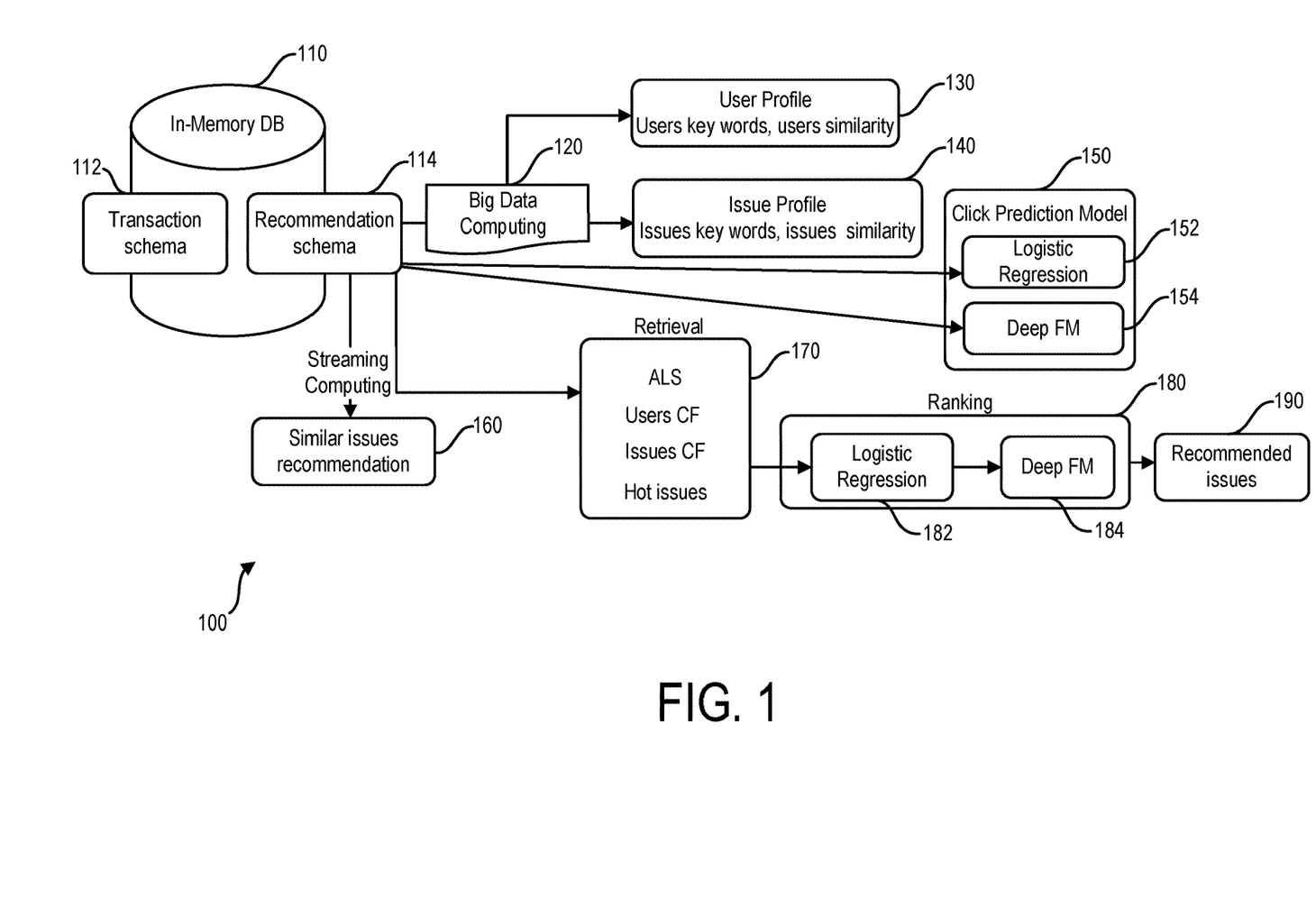
FIG. 1 is a diagram illustrating a computing architecture for providing issue recommendations using machine learning.

FIG. 1 is diagram 100 illustrating an example architecture for providing recommendations. An in-memory database 110 (i.e., a database having main memory and associated physical storage in which operations are predominantly performed in the main memory). The database can store data in various schemas including a transaction schema 112 and a recommendation schema 114. The transaction schema 112 can, for example, be the database schema used for a consuming application (e.g., issues management application). Given the desire not to impact the consuming application, recommendation data can be stored in the recommendation schema 114.

Using data stored in the transaction schema 112, a user profile 130 and an issue profile 140 can be generated using, for example, a big data computing framework 120 such as APACHE SPARK. The user profiles 130 and issue profiles 140 can be stored in the in-memory database 110. As will be described in more detail below, issues can be retrieved 170 from the recommendation schema 114 using various techniques including, for example, alternating least squares (ALS), collaborative filtering (CF) as applied to users and to issues, and hot issues. Issues identified using some or all of these retrieval techniques can be combined to provide the issues.

Using the user profiles 130, issue profiles 140 and historical issues click log data (i.e., issues data previously traversed or reviewed by the user or similar users), a click prediction model 150 can be trained. In some variations, the click prediction model 150 can be an ensemble of models including a logistic regression model 152 and a neural network model such as a DeepFM model. Logistic regression 152 can be first used to rank the issues, which is the probability of the issues. Thereafter, a certain threshold of these issues (e.g., top 500 issues) can be input into the more complex (and computationally intensive DeepFM model to get a probability for each issue. The number of issues can be further culled (e.g., recommended 100 issues). The temporary data as well as the final data can be stored in the in-memory DB 110 (for more rapid access, calculations, etc.).

In operation, a user in a graphical user interface of a front-end application 210 (see FIG. 2) on a client device, may enter information specifying a particular issue and/or click on or otherwise interacting with a GUI element associated with an existing issue displayed in the graphical user interface. The application 210 then generates a query based on such information/click in a front end application. Given the nature of the in-memory database 110, real-time/near real-time recommended issues similar to the one specified in the query can be provided (160). In some cases, a similarity matrix is used to calculate the top 10 similar issues.

Figure 2:
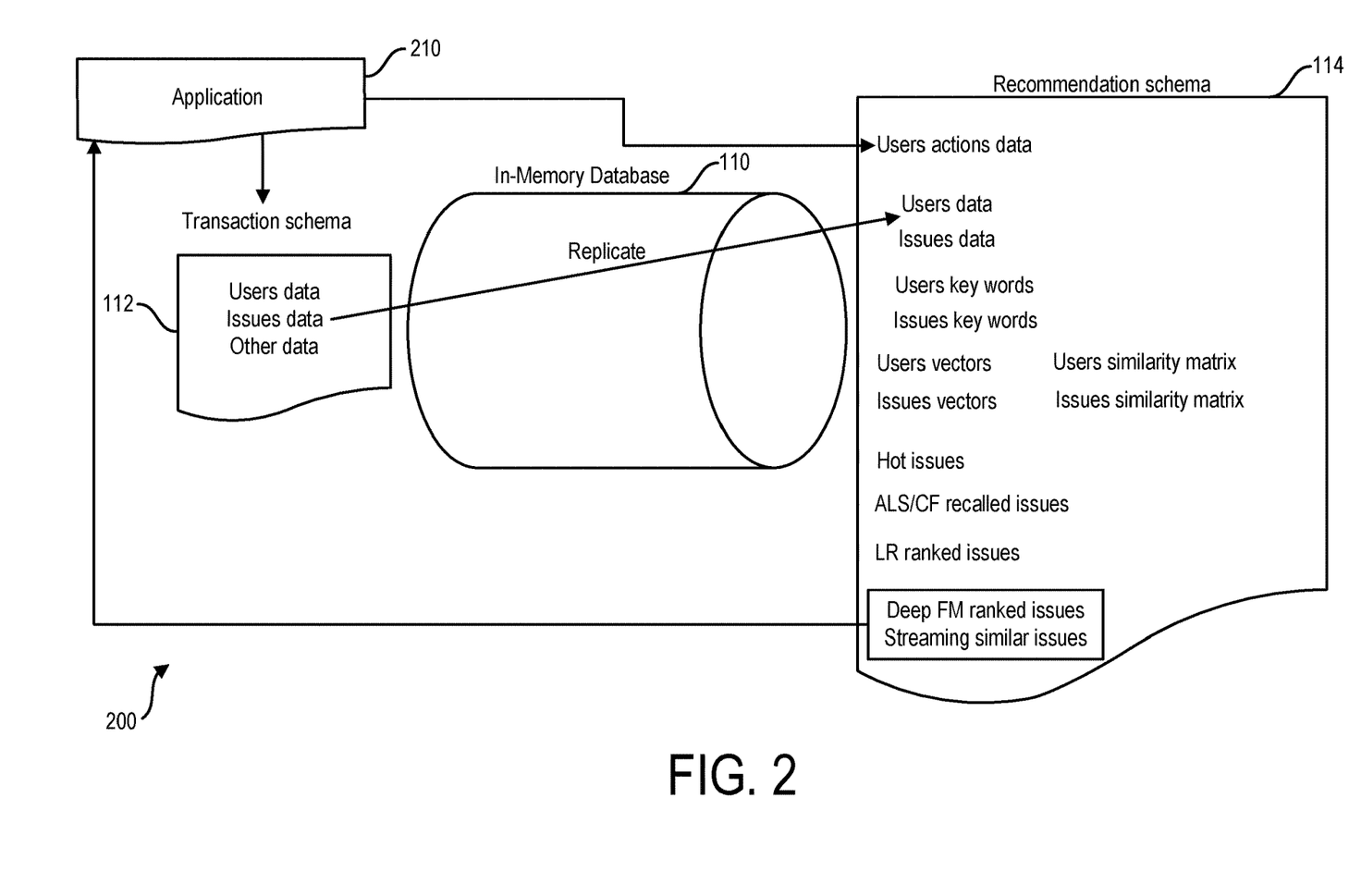
FIG. 2 is a diagram illustrating a sample manner in which data can be stored in an in-memory database.

With reference to diagram 200 of FIG. 2, the in-memory database 110 can be the core of data storage. Various types of databases can be used including, for example, SAP HANA database. For use by the application 210, the transactional schema 112 can be used to store application related tables such as users data, issues data and other data which is highly related with issues management business. As the application is running, there can be update/delete/add actions to the transactional data. A regular task can be scheduled to replicate the users data and issues data to another schema which is recommendation schema 114. In some cases, the two schemas 112, 114 can be hosted on different database nodes (in this case of a distributed database system) so as to ensure that performance of the application 210 is not impacted by the issue recommendation computing.

During recommendation computing processing, there may be some temporal/intermediate results stored in the in-memory database 110. For example, when the application 210 is running, user actions data can be directly stored into recommendation schema 114. APACHE KAFKA or other message publisher and subscriber systems can be used in this regard.

Within the recommendation schema 114, after the users keywords are extracted (as described in further detail below, each user can have a predetermined number (e.g., 10, etc.) keywords; after the issues keywords are extracted (as described in further detail below), each issue can also have a predetermined number (e.g., 10, etc.) keywords. All of these keywords can be stored in the in-memory database 110.

The recommendation schema 114 can also include other data including users vectors and issues vectors as each user will have a corresponding vector and each issue will also have a vector. A similarity matrix can be calculated for each user relative to each other user so that every two users will yield a similarity number. Similarly, an issues similarity matrix with comprise a similarity number for every two issues.

The recommendation schema 114 can also include hot issues which comprise analysis results from user actions data; which can characterize or otherwise reflect the top hot issues in the last few days. These hot issues can comprise, for example, ALS/CF retrieved issues and LR ranked issues. All of such issues can have their own table in the recommendation schema 114.

Finally with DeepFM model, there are recommended issues; and with SPARK Streaming, there are similar issues based on user clicks. These recommended and similar issues can be loaded into the memory of the in-memory database 110 for rapid access. The issues can be read and displayed in application UI. These were the final results of recommendation and included in the recommendation schema 114.

Figure 3:
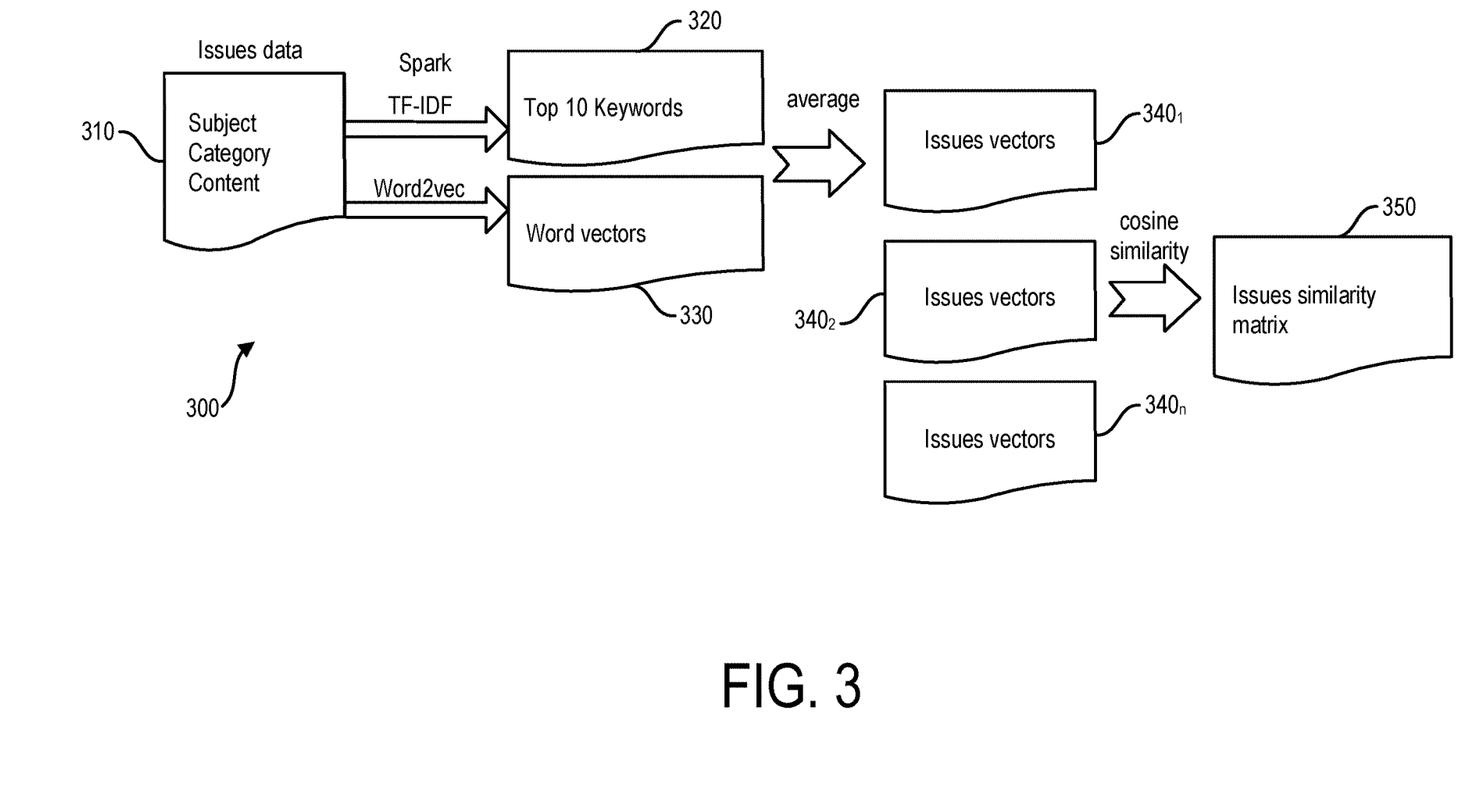
FIG. 3 is a diagram illustrating generation of an issues profile.

FIG. 3 is a diagram 300 illustrating information used to generate an issues profile 140. Issues data 310 can be replicated from the transaction schema 112 and can, include information/attributes such as Subject which is the subject of the issue, Category which is the category associated with the issue, and Content which provides additional information about the issue. Other attributes can be included, for example, submitter, date, priority etc.

TF-IDF (term frequency-inverse document frequency), a statistical measure that evaluates how relevant a word is to a document in a collection of documents, can be used to identify a certain number (e.g., 10) top keywords. This was calculated by multiplying two metrics: how many times a word appears in a document, and the inverse document frequency of the word across a set of documents (in this context each issue is treated as a separate document).

To put it in more formal mathematical terms, the TF-IDF score is as below:

$$tfidf(t, d, D) = tf(t, d) \cdot idf(t, D)$$

And, $$tf(t, d) = \log(1 + freq(t, d))$$

$$idf(t, D) = \log\left(\frac{N}{\text{count}(d \in D: i \in d)}\right)$$

For each issue, there is TF-IDF score for each word. These scores can be used to obtain, for example, the top 10 keywords 320 which are weighted as top 10, so each issue can have an associated top 10 keywords. It will be appreciated that different number of top keywords can be identified based on user preference.

Further, a word embedding model such as a Word2Vec model can be trained based on the content of existing issues. The Word2Vec model, which learns word embeddings using a shallow neural network, is used to generate a vector for each word 330. Example word vectors 330 include: Word1—vector1, Word2—vector2, Word3—vector3, etc. Combining the top 10 keywords 320 for each issue, there are then 10 vectors for each issue. An average vector for the 10 vectors can be calculated as follows: avgVec=average(vector1+vector2+ . . . vector10). Here vectora+vectorb means adding two vectors from the same dimension. Therefore, for each issue (1 . . . n), a vector $340_1$ . . . $340_n$ is calculated to represent it.

Subsequently, a similarity between each pair of issue vectors $340_1$ . . . $340_n$ to result in an issues similarity matrix 350. Similarity can be calculated, via various mechanisms, including a cosine similarity between every two vectors. Cosine similarity is a measure of similarity between two non-zero vectors of an inner product space that measures the cosine of the angle between them.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}.$$

Here $A_i$ and $B_i$ are components of vector A and vector B respectively.

All above computing can be performed by the big data computing framework 120 (e.g., SPARK, etc.). The issues keywords, issues vectors and issues vectors similarity matrix can all be stored in the in-memory database 110 (e.g., SAP HANA).

Figure 4:
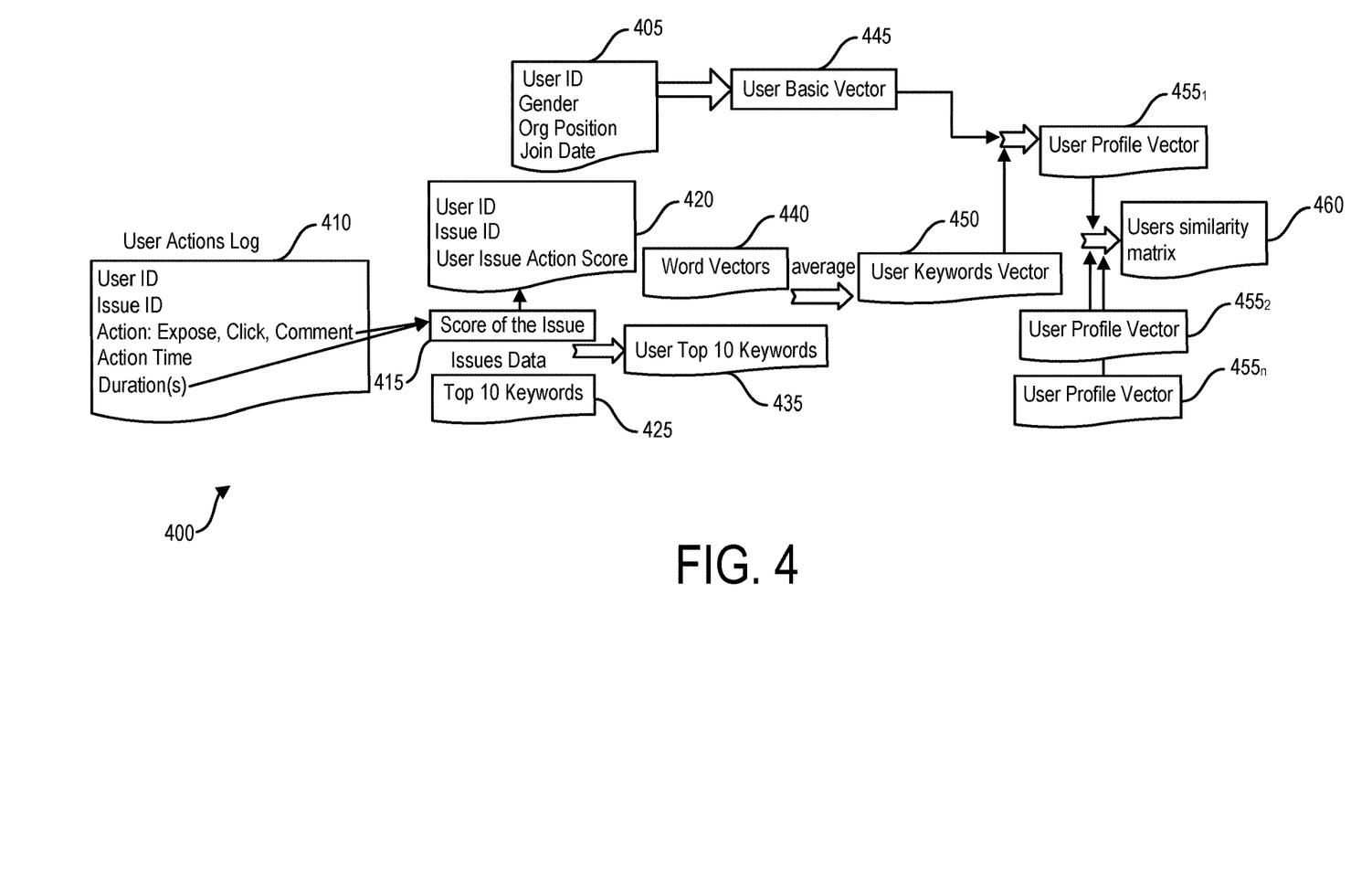
FIG. 4 is a diagram illustrating generation of a user profile.

FIG. 4 is a diagram 400 which relates to the generation of user profiles. A user actions log 410 can comprise various information associated with a user including user ID, issue ID, the type of action associated with such an issue (e.g., expose, click, comment, etc.), a timestamp for such action, and a duration of such action, and the like. In this regard, for different types of actions, expose refers to the issue being displayed to that user and waiting for user click, click refers to the user clicking the issue (i.e., activating a graphical user interface element associated with the issue) to obtain further details, comment refers to the user entering a comment to the issue. Therefore, for different actions, together with the duration, a score 415 can be obtained which characterizes how much the user rates the issue.

For example, Expose.—0; Click—1; Comment—3 these can give the basic score; and for duration, <3 seconds, 1; 3 seconds to 10 seconds, 2; >10 seconds, 3, etc. By multiplying the action score with the duration score, a preferable score of the user against this issue can be obtained (415). Therefore, a user/issue score may not be available for all combinations, because not all users have the actions log data. In this case, the score can be maintained as 0.

The in-memory database can already have the issues top 10 keywords stored 425, so that for each issue, there are corresponding 10 keywords.

Further, the top 10 keywords 435 can be calculated for a specific user. The process can be as follows. For a specific user, all issues and corresponding scores are listed for this issue. User→Issue1<score, keywords>, Issue2<score, keywords> . . . . The score and keywords can be combined for all issues of this user. The mappings can be as below: User→<Keyword1, score1>, <Keyword2, score2> . . . . This technique can be used to obtain a large number of keywords for the user, each of which has a score. The keywords can then be ranked according to score and a certain amount can be maintained (in this example there are 10 maintained).

Word vectors data 420 can be obtained from the in-memory database to convert each keyword into a vector 440. A vector 450 can be obtained for this user that represents the top 10 keywords using the average calculation (as described above).

Moreover, user basic data 405 can be obtained from the in-memory database and the corresponding features can be converted to numeric values (eg: Gender, male 1, female 0.) and vectorized 445.

The user basic vector 445 can then be combined with the user keyword vector 450, for example, using vector concatenation. The result of this combination can be referred to as a user profile vector 455 which is then stored in the in-memory database. As noted, each user can have their own corresponding user profile vector $455_1 \ldots _n$. Similarities for the user profile vectors $455_1 \ldots _n$ can be calculated using, for example, the same similarity techniques described above to result in a user similarity matrix 460 which can be stored in the in-memory database.

Figure 5:
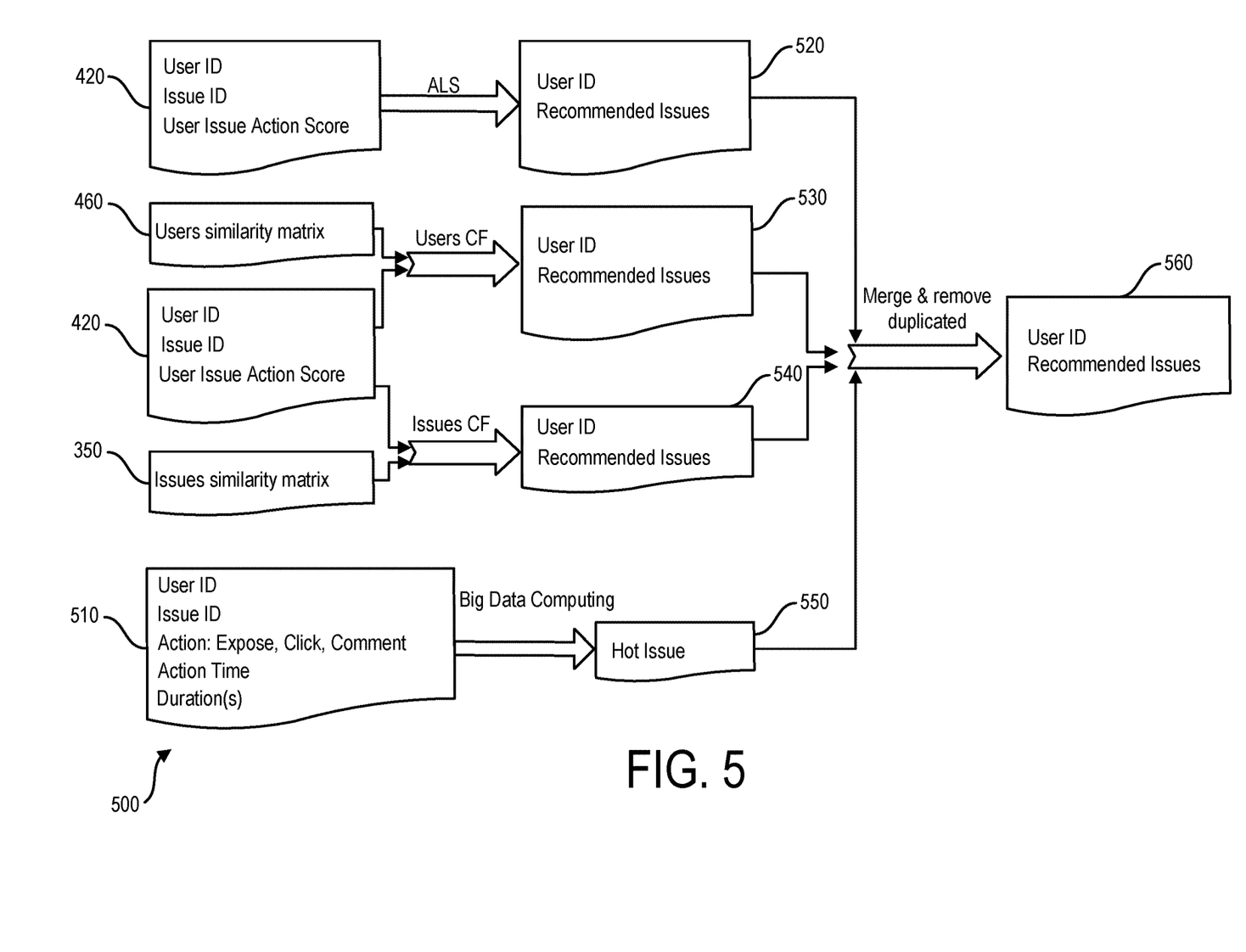
FIG. 5 is a diagram illustrating retrieval of relevant issues using different modalities.
Figure 6:
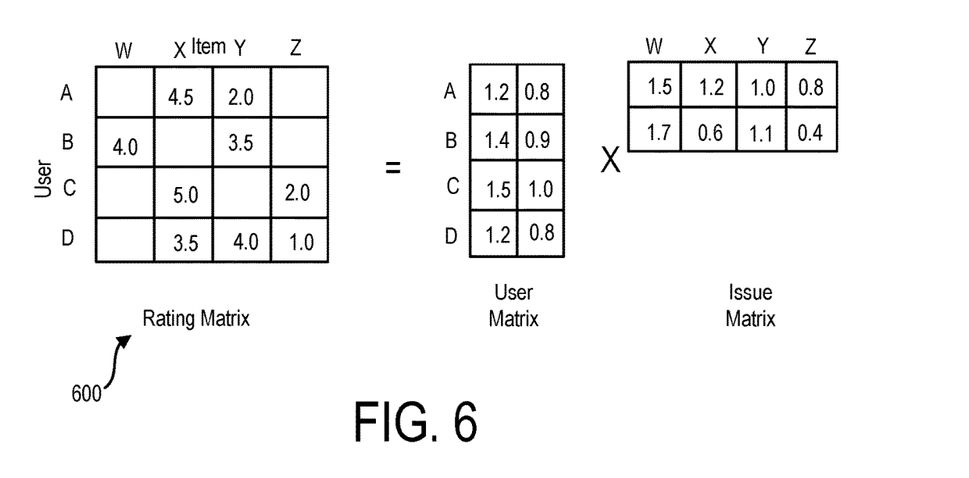
FIG. 6 is a diagram illustrating generation of a rating matrix.

FIG. 5 is a diagram 500 illustrating multi-retrieval techniques to ultimately obtain recommended issues for a particular user 560. Alternating Least Square (ALS), a matrix factorization algorithm, can provide recommendations for a particular user for a particular issue based on the related user issue action scores. As illustrated in diagram 600 of FIG. 6, a matrix factorization is a factorization of a matrix into a product of matrices. In the case of collaborative filtering, matrix factorization algorithms work by decomposing the user-issue interaction matrix into the product of two lower dimensionality rectangular matrices.

With an ALS trained algorithm, scores can be predicted for each user against all issues. By ranking these scores, a first subset of recommended issues 520 can be obtained for the user.

Further, user collaborative filtering (CF) can be part of a user-based top-N recommendation algorithm which uses a similarity-based vector model (using the users similarity matrix 460 and the user information 430) to identify the k most similar users to an active user. These k most similar users can then be used to generate a second subset of recommended issues 530.

Similarly, issue CF can be part of an issue-based top-N recommendation algorithm (which can use an issues similarity matrix 350 and user information 420) to identify the k most similar issues to a user. The k most similar issues can then be used to generate a third subset of recommended issues 540.

Using users action log 510 comprising information such as user ID, issue ID, action taken by the user in connection with such issue, the time when such action occurred and/or a duration. Big data computing resources (e.g., SPARK) can be used to perform an aggregation. The top ranked (e.g., 100, etc.) hottest issues can be found based on user issues scores (i.e., scores for the specific issue can be generated and sort by final score of it). The issues retrieved from each of these sources 520, 530, 540, 550 can be combined (and in some cases duplicates removed) to result in a final list of recommended issues 560. These recommended issues 560 can be loaded into main memory of the in-memory database for rapid access and/or processing.

Figure 7:
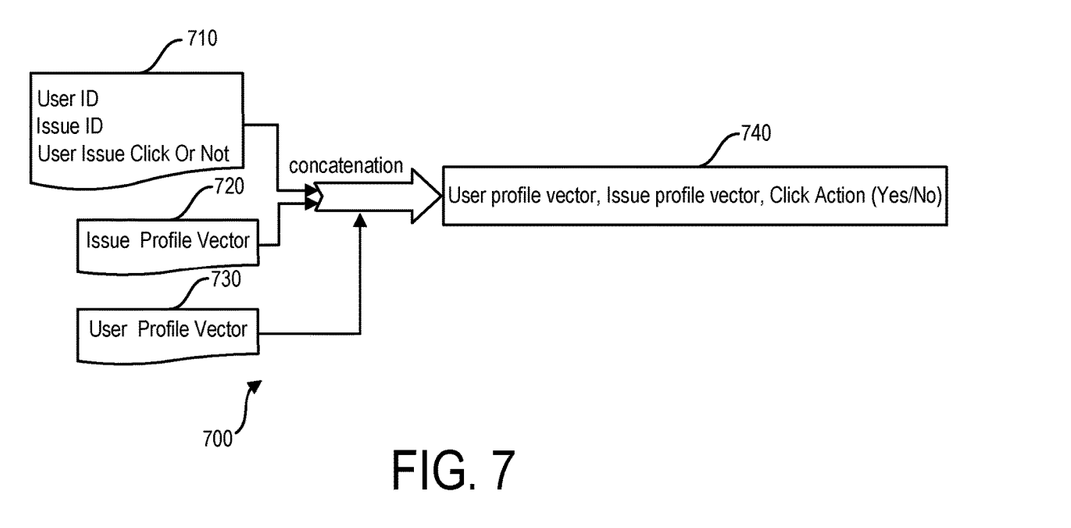
FIG. 7 is a diagram illustrating preparation of training data.

FIG. 7 is a diagram 700 illustrating a sample technique for training data in which data is used 710 which indicates whether a particular user interacted (e.g., clicked on an associated GUI element, etc.) with a particular issue. This information can be combined (e.g., concatenated) with an issue profile vector 720 and a user profile vector 730 to form data 740 sufficient to train various machine learning models. Various normalization techniques and the like can be performed to facilitate training by such models.

Figure 8:
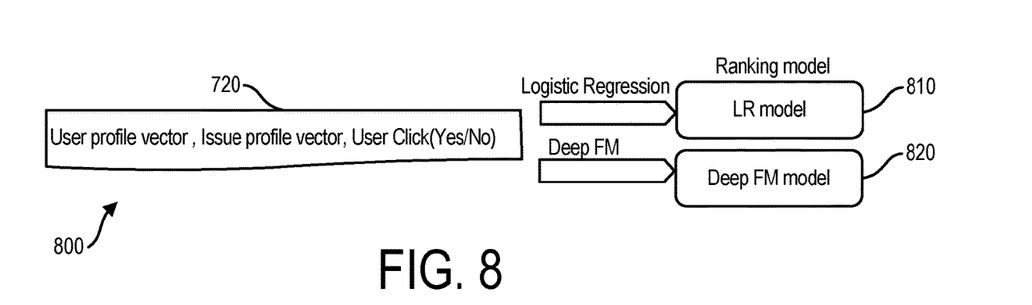
FIG. 8 is a diagram illustrating training of machine learning models.

With reference to diagram 800 of FIG. 8, the training data 740 can be used to train a logistic regression model 810 and a DeepFM model 820. The logistic regression model 810 can be used to model the probability of a certain class or event existing such as the probability of click or not. The logistic regression model 810, sometimes referred to as the sigmoid function which was developed by statisticians to describe properties of population growth in ecology, rising quickly and maxing out at the carrying capacity of the environment. It's an S-shaped curve that can take any real-valued number and map it into a value between 0 and 1, but never exactly at those limits.

$1/(1+e^{\text{-value}})$

The DeepFM model 820 is a neural network model that integrates the architectures of factorization machine (FM) and deep neural networks (DNN). The DeepFM model 820 models low-order feature interactions like FM and models high-order feature interactions like DNN. The DeepFM model 820 combines the power of factorization machines for recommendation and deep learning for feature learning in a new neural network architecture. Various frameworks can be used for training the DeepFM model 820 including pytorch. Both the LR model 810 and the DeepFM model 820 can be trained using corresponding training data. The models 810, 820 which comprise binary outputs can be saved in a share folder so that they can be subsequently loaded to predict the output according to input data.

Figure 9:
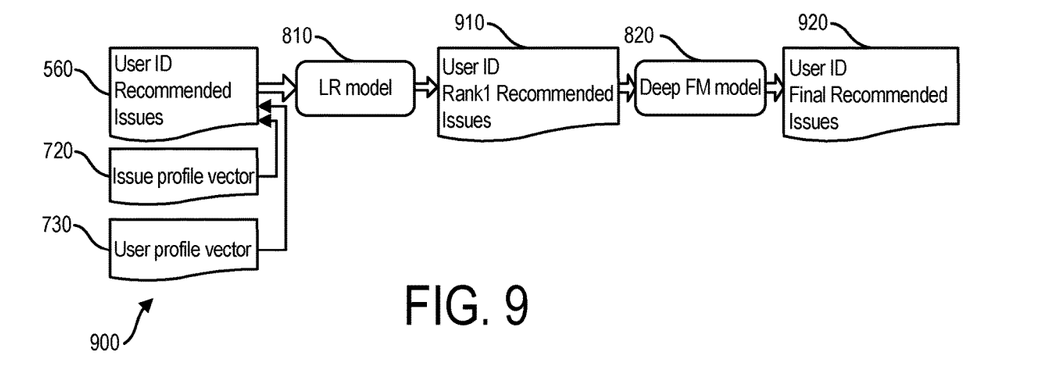
FIG. 9 is a diagram illustrating ranking of retrieved issues.

FIG. 9 is a diagram 900 illustrating an arrangement for ranking retrieved issues. The user recommended issues 560, which are formed based, in part, on the issue profile vector 720 and the user profile vector 730, can be input into the logistic regression model 810 (from the shared folder). The logistic regression model 810 predicts the probability of user against each of the issues. The top 1000 issues after this prediction 990 can be determined and such result can be stored in the in-memory database. Furthermore, the DeepFM model 820 (which is loaded from a shared folder) is used to rank the top 1000 last issues by probability of each user click issue. A certain number of issues, e.g., top 200 issues, can be filtered out and stored into the in-memory database. These top 200 issues can be displayed to a user (at once or partially over several screens, etc.) as part of a graphical user interface for recommended issues.

Figure 10:
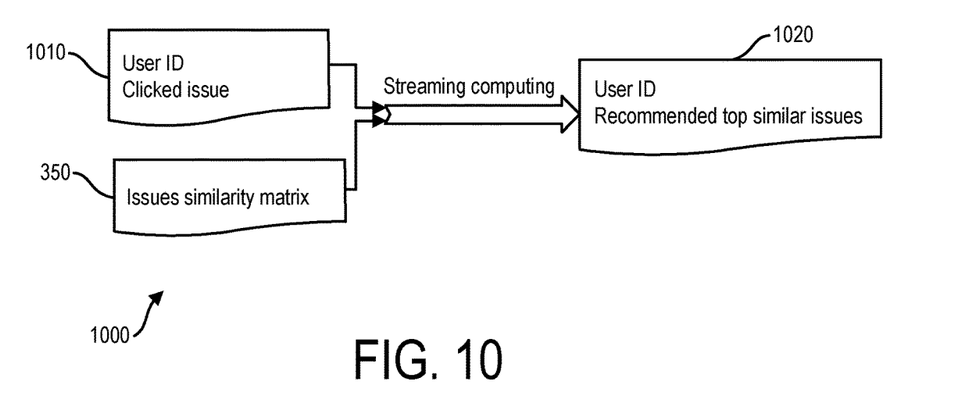
FIG. 10 is a diagram illustrating real-time streaming of issue recommendations.

FIG. 10 is a diagram 1000 illustrating real-time streaming recommendations in which, a particular user clicks an issue 1010. Using the corresponding issues similarity matrix 350 (which can be loaded from the main memory of the in-memory database) the top similar issues for such user can then be determined/displayed at 1020. Streaming services such as SPARK streaming can be used to process the data in real-time.

Figure 11:
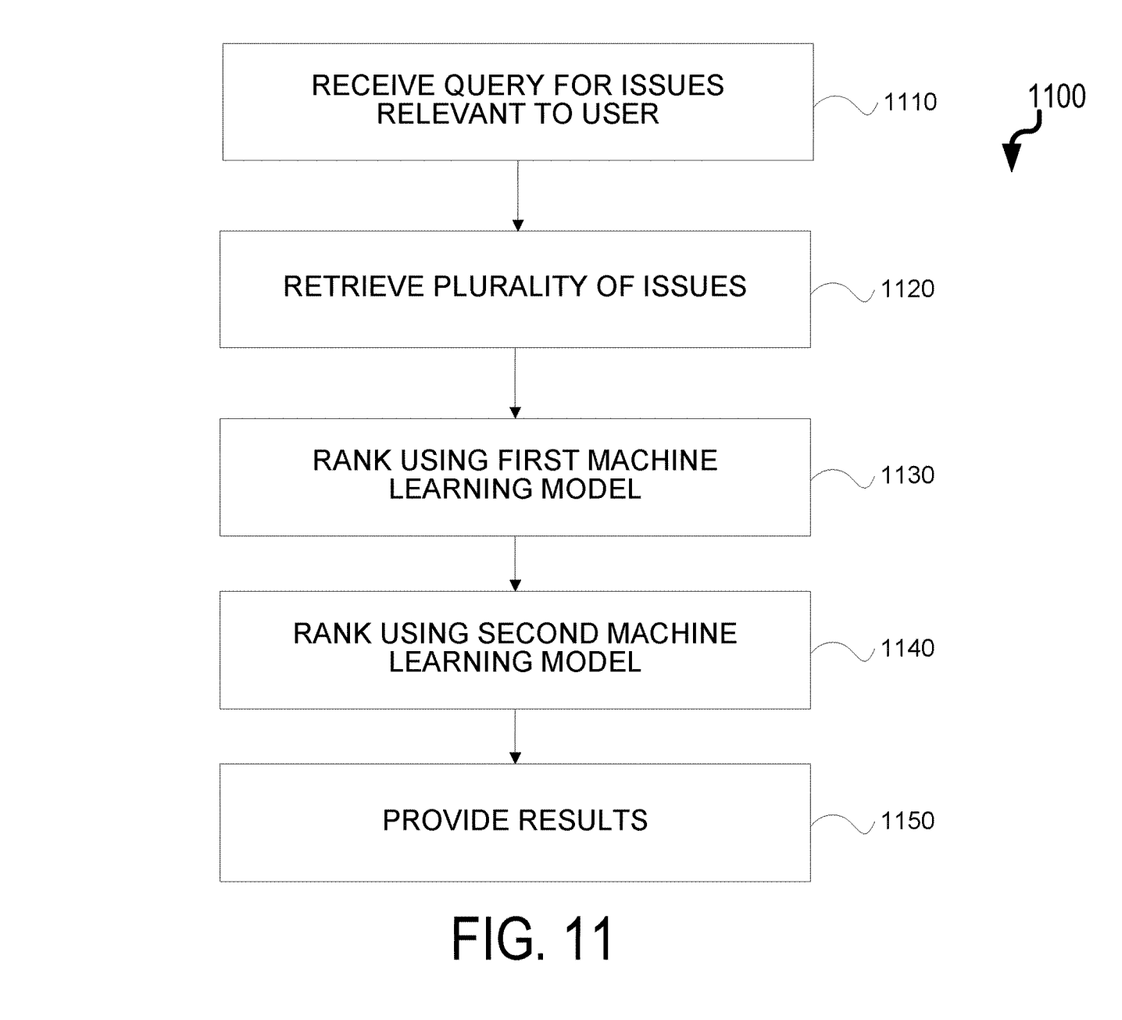
FIG. 11 is a process flow diagram illustrating issues recommendations using machine learning.

FIG. 11 is a diagram 1100 in which, 1110, a query is received that requests issues relevant to a user. Thereafter, at 1120, a plurality of issues responsive to the query are received. These issues are later ranked, at 1130, using a first machine learning model to result in a first subset of the retrieved issues. Subsequently, at 1140, the first subset of the retrieved issues are ranked using a second, different machine learning model to result in a second subset of the retrieved issues (such that the second subset of the retrieved issues is a subset of the first subset of the retrieved issues). Data can then be provided, at 1150, which is responsive to the query comprising at least a portion of the second subset of the retrieved issues.

Figure 12:
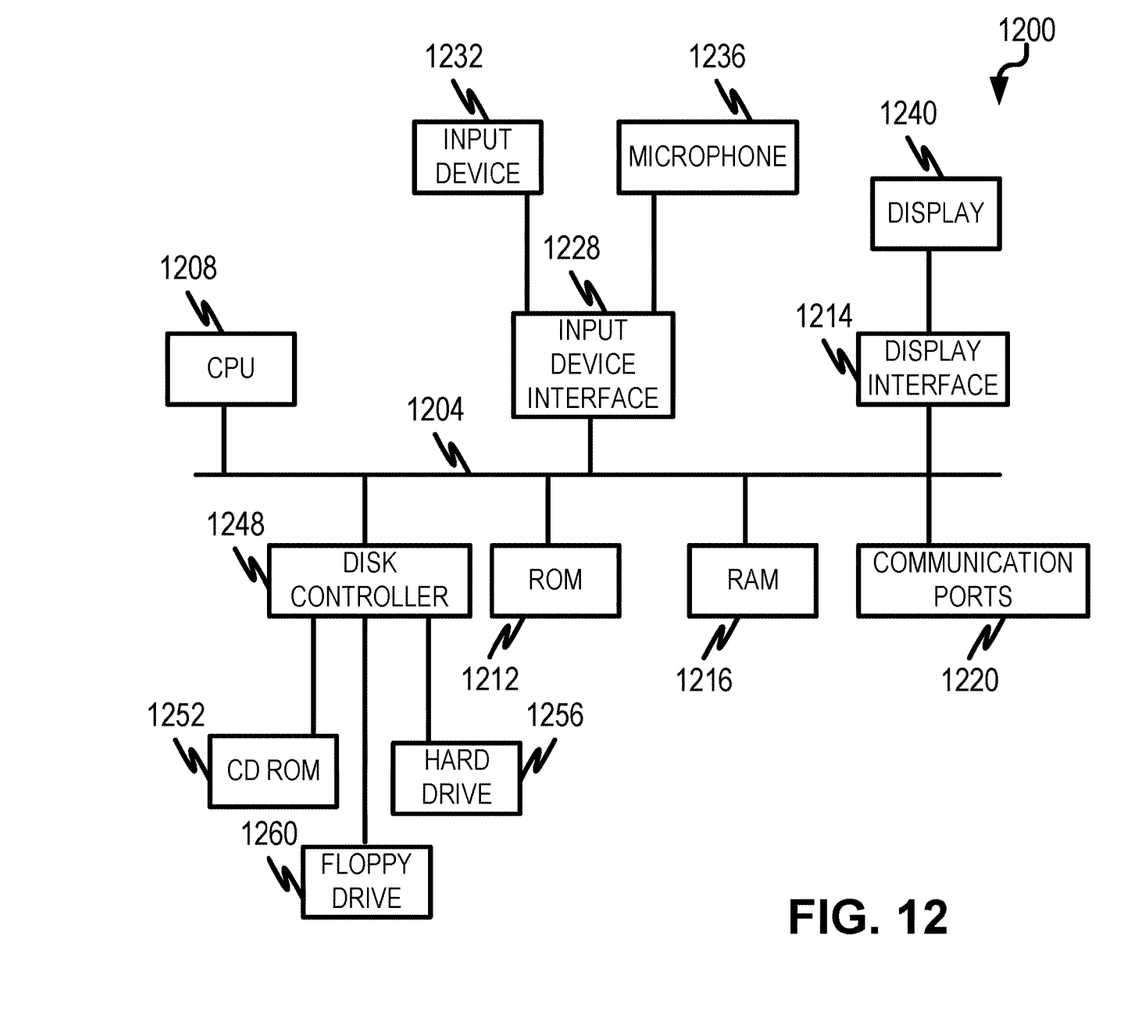
FIG. 12 is a diagram illustrating aspects of a computing device for implementing the current subject matter.

FIG. 12 is a diagram 1200 illustrating a sample computing device architecture for implementing various aspects described herein. A bus 1204 can serve as the information highway interconnecting the other illustrated components of the hardware. A processing system 1208 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1212 and random access memory (RAM) 1216, can be in communication with the processing system 1208 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1248 can interface with one or more optional disk drives to the system bus 1204. These disk drives can be external or internal floppy disk drives such as 1260, external or internal CD-ROM, CD-R, CD-RW or DVD, or solid state drives such as 1252, or external or internal hard drives 1256. As indicated previously, these various disk drives 1252, 1256, 1260 and disk controllers are optional devices. The system bus 1204 can also include at least one communication port 1220 to allow for communication with external devices either physically connected to the computing system or available externally through a wired or wireless network. In some cases, the at least one communication port 1220 includes or otherwise comprises a network interface.

To provide for interaction with a user, the subject matter described herein can be implemented on a computing device having a display device 1240 (e.g., a CRT (cathode ray tube) or LCD (liquid crystal display) monitor) for displaying information obtained from the bus 1204 via a display interface 1214 to the user and an input device 1232 such as keyboard and/or a pointing device (e.g., a mouse or a trackball) and/or a touchscreen by which the user can provide input to the computer. Other kinds of input devices 1232 can be used to provide for interaction with a user as well; for example, feedback provided to the user can be any form of sensory feedback (e.g., visual feedback, auditory feedback by way of a microphone 1236, or tactile feedback); and input from the user can be received in any form, including acoustic, speech, or tactile input. The input device 1232 and the microphone 1236 can be coupled to and convey information via the bus 1204 by way of an input device interface 1228. Other computing devices, such as dedicated servers, can omit one or more of the display 1240 and display interface 1214, the input device 1232, the microphone 1236, and input device interface 1228.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more issues. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving a query requesting issues relevant to a user;
   retrieving a plurality of issues responsive to the query;
   generating a user similarity matrix by generating a plurality of user profile vectors and calculating a similarity between each pair of user profile vectors;
   first ranking the retrieved issues using a first machine learning model to result in a first subset of the retrieved issues;
   second ranking the first subset of the retrieved issues using a second, different machine learning model to result in a second subset of the retrieved issues, the second subset of the retrieved issues being a subset of the first subset of the retrieved issues; and
   providing data responsive to the query comprising at least a portion of the second subset of the retrieved issues;
   wherein generating a user profile vector comprises:
      scoring each issue based on user actions stored in a user actions log;
      ranking keywords for the user based on the scoring of the issues to generate a list of top keywords; and
      generating user keywords vectors based on the list of top keywords.

2. The method of claim 1, wherein the first machine learning model comprises a logistic regression model.

3. The method of claim 2, wherein the second machine learning model comprises a neural network model.

4. The method of claim 3, wherein the neural network model comprises a DeepFM model.

5. The method of claim 1, wherein the plurality of issues are retrieved using different retrieval modalities.

6. The method of claim 5, wherein one of the retrieval modalities comprises:
   predicting scores for the user against each issue using an alternating least squares algorithm;

ranking the issues according to their scores; and
filtering out scores below a pre-defined threshold.

7. The method of claim 6 further comprising:
filtering the retrieved plurality of issues based on collaborative filtering in relation to issues.

8. The method of claim 7, wherein the collaborative filtering in relation to issues uses an issues similarity matrix.

9. The method of claim 8 further comprising:
generating the issues similarity matrix by:
identifying, based on issues data, a predefined number of top keywords associated with the user using a term frequency-inverse document frequency; and
generating, based on issues data, a plurality of word vectors using a word embedding model;
generating a plurality of issue vectors based on the identification of the predefined number of top keywords and the generated plurality of word vectors;
calculating a similarity between each pair of issue vectors to result in the issues similarity matrix.

10. The method of claim 6 further comprising:
filtering the retrieved plurality of issues based on collaborative filtering in relation to users.

11. The method of claim 10, wherein the collaborative filtering in relation to users uses the user similarity matrix.

12. The method of claim 1, wherein each user profile vector is generated by concatenating a user keywords vector with a user basic vector.

13. The method of claim 12, wherein the user keywords vector is derived from the user actions log which comprises information comprising a user identification (ID), issue ID, a type of action associated with the issue, a timestamp for the action, and a duration of the action.

14. The method of claim 1, wherein the providing data comprises at least one of: causing the data to be displayed in a graphical user interface, loading the data into memory, storing the data in physical persistence, or transmitting the data to a remote computing system.

15. A system comprising:
at least one data processor; and
memory storing instructions which, when executed by the at least one data processor, result in operations comprising:
receiving a query requesting issues relevant to a user;
retrieving a plurality of issues responsive to the query;
generating a user similarity matrix by generating a plurality of user profile vectors and calculating a similarity between each pair of user profile vectors;
first ranking the retrieved issues using a first machine learning model to result in a first subset of the retrieved issues;
second ranking the first subset of the retrieved issues using a second, different machine learning model to result in a second subset of the retrieved issues, the second subset of the retrieved issues being a subset of the first subset of the retrieved issues; and
providing data responsive to the query comprising at least a portion of the second subset of the retrieved issues,
wherein generating a user profile vector comprises:
scoring each issue based on user actions stored in a user actions log;
ranking keywords for the user based on the scoring of the issues to generate a list of top keywords; and
generating user keywords vectors based on the list of top keywords.

16. The system of claim 15 further comprising:
an in-memory database which receives the query and retrieves the plurality of issues responsive to the query.

17. A non-transitory computer program product storing instructions which, when executed by at least one computing device, results in operations comprising:
receiving a query requesting issues relevant to a user;
retrieving a plurality of issues responsive to the query;
generating a user similarity matrix by generating a plurality of user profile vectors and calculating a similarity between each pair of user profile vectors;
first ranking the retrieved issues using a first machine learning model to result in a first subset of the retrieved issues;
second ranking the first subset of the retrieved issues using a second, different machine learning model to result in a second subset of the retrieved issues, the second subset of the retrieved issues being a subset of the first subset of the retrieved issues; and
providing data responsive to the query comprising at least a portion of the second subset of the retrieved issues,
wherein generating a user profile vector comprises:
scoring each issue based on user actions stored in a user actions log;
ranking keywords for the user based on the scoring of the issues to generate a list of top keywords; and
generating user keywords vectors based on the list of top keywords.

18. The non-transitory computer program product of claim 17, wherein the first machine learning model comprises a logistic regression model and the second machine learning model comprises a DeepFM model.

* * * * *